United States Patent Office 3,392,177
Patented July 9, 1968

3,392,177
CONJUGATION OF VEGETABLE OILS VIA IRON TRICARBONYL COMPLEX AND DECOMPOSITION THEREOF BY CARBON MONOXIDE
Edwin N. Frankel, Peoria, Ill., assignor to the United States of America as represented by the Secretary of Agriculture
No Drawing. Filed Oct. 13, 1965, Ser. No. 495,734
1 Claim. (Cl. 260—405.6)

ABSTRACT OF THE DISCLOSURE

This invention involves the pressurized carbon monoxide decomposition of iron tricarbonyl complexes of polyunsaturated vegetable oils formed during the isomerization of such oils with iron pentacarbonyl catalyst at 185° C.

A nonexclusive, irrevocable, royalty-free license in the invention herein described, throughout the world for all purposes of the United States Government, with the power to grant sublicenses for such purposes, is hereby granted to the Government of the United States of America.

This invention relates to an improved process for decomposing the pi-electron type iron tricarbonyl complexes of polyunsaturated vegetable oils such as soybean, linseed, and safflower and of the alkyl esters thereof, high yields of which conjugation-containing fatty complexes are directly produced by one-step iron pentacarbonyl isomerizations of polyunsaturated vegetable oil materials at a critical temperature of 185° C. wherein the small amount of noncomplexed residual glyceride or fatty acid ester is found also to be extensively conjugated, thus adding to the yield of conjugated drying oil material obtained when the thusly produced iron tricarbonyl fatty complex is decomposed by ferric chloride, as taught in my copending application, S.N. 470,938, filed July 9, 1965, now Patent No. 3,373,175, or, preferably, is decomposed by pressurized carbon monoxide in accordance with the instant invention.

Although the conjugated fatty products obtained following ferric chloride decomposition of the indicated iron tricarbonyl fatty complexes have utility as coatings and film formers, they suffer a cost disadvantage since the iron tricarbonyl moiety dissociated therefrom is wholly decomposed by the $FeCl_3$ to carbon monoxide and useless elemental iron.

The object of the present invention is a process for substantially quantitatively decomposing the indicated iron tricarbonyl conjugated fatty complexes whereby extensive polymerization and loss of the thereby released conjugated fatty portion of the complex is avoided and whereby the tricarbonyl moiety of the complex is concurrently regenerated to recoverable iron pentacarbonyl instead of being further decomposed, as with ferric chloride, to carbon monoxide and utterly useless elemental iron. After recovery by distillation or equivalent means, the regenerated iron pentacarbonyl is added to the previously recovered unreacted excess iron pentacarbonyl and the whole, plus a negligible amount of makeup is then returned or recycled continuously or intermittently for reuse. In other words, simultaneous decomposition of the iron tricarbonyl fatty complex and regeneration of the dissociated iron tricarbonyl to conjugation-producing iron pentacarbonyl avoids the outright loss of 1 mole of reactant per batch and significantly lowers the overall cost of the desired conjugated vegetable oils and esters.

In accordance with the above object, I have now discovered that carbon monoxide at certain pressures and temperatures essentially quantitatively decomposes the iron tricarbonyl-conjugated fatty complexes that are directly formed with negligible formation of polymer and in substantially theoretical yields without requiring repeated ventings by isomerizing nonconjugated unsaturated vegetable oils or esters at 185° C. in the presence of a 1 mole excess of iron pentacarbonyl and that the carbon monoxide also directly regenerates the dissociated iron tricarbonyl to reusable iron pentacarbonyl.

Example 1

Soybean oil, 238 g., 0.8 mole, containing 59.6% polyunsaturated fatty acids, was charged into a 1-liter magnetically stirred, high pressure autoclave equipped with sampling tube and cooling coil. To the oil maintained under a nitrogen atmosphere was added 326 g. (1.7 mole) of freshly distilled iron pentacarbonyl. The mixture was blanketed with nitrogen. The autoclave was then sealed and purged three times with nitrogen at a pressure of 200 p.s.i. with stirring. After releasing the pressure, the autoclave was charged again with approximately 30 p.s.i. nitrogen prior to heating. The reaction mixture was heated at 185° C. for 4.5 hours. During the reaction the pressure in the system increased to a maximum of about 300 p.s.i. after 1.5 hour and then fell to 200 p.s.i. The autoclave was then cooled to room temperature. The reaction mixture was transferred with benzene into a distilling flask. Unreacted excess iron pentacarbonyl and benzene were removed by azeotropic distillation at 81–88° C. at atmospheric pressure under a blanket of nitrogen. The last portions of benzene and iron pentacarbonyl were removed by evacuation at 60–80° C. with a vacuum pump (2–3 mm. mercury) using a Dry Ice trap. The nonvolatile dark oil that remained was dissolved in petroleum ether (boiling range 39–52° C.) and washed several times with dilute HCl (2 parts HCl, 1 part water), and then with water to neutrality. After drying over $Na_2SO_4$ the solvent was removed by distillation. Infrared analyses at $4.79\mu$ and $5.06\mu$ showed that the soybean oil-iron tricarbonyl product comprised 58.8% complex corresponding to a yield of 85.4% based on the polyunsaturated fatty acid content of the starting soybean oil.

72.1 g. of the iron tricarbonyl-complexed soybean oil comprising 42.4 g. of iron tricarbonyl-polyunsaturated fatty acid complex was charged in a 1-liter magnetically stirred autoclave provided with a holder insert having a capacity of 150 ml. The autoclave was then sealed and purged three times with carbon monoxide at a pressure of 200 p.s.i. After releasing the pressure, the autoclave was charged again with 800 p.s.i. carbon monoxide prior to heating. The reaction mixture was heated at 200° C.±2° C. for 4 hours. The pressure during the reaction ranged from 1,010 to 1,090 p.s.i. As soon as the content of iron tricarbonyl complex had decreased to a constant value, as shown by successive infrared analyses, the reaction was terminated by cooling in order to avoid extensive polymerization. When the reacted mixture reached room temperature, it was transferred into a distilling flask, and the regenerated iron pentacarbonyl was distilled at 92° C. under a nitrogen blanket at atmospheric pressure. To avoid loss of conjugation through excessive heating, the last portion of iron pentacarbonyl was removed by vacuum stripping at 100° C. leaving 55.2 g. of conjugated soybean oil product. The stripped oil contained 5.7% residual iron tricarbonyl complex indicating a 90.2% decomposition of the original content of complex. Analysis of the soybean oil product by gas chromatography showed that it contained 10.3% cis,trans conjugated dienes, 29.9% trans,trans conjugated dienes, and 4.4% conjugated trienes making a total of 44.6% conjugated fatty acids corresponding to 74.8% conjugation of the total polyunsaturated fatty acids in the original soybean oil.

A 16.9 g. yield of regenerated iron pentacarbonyl was obtained. This corresponded to 98% of theory. The distilled volatile material was identified as iron pentacarbonyl by the characteristic strong infrared absorption bands at $4.89\mu$ and $5.0\mu$. The recovered iron pentacarbonyl can thus be recycled for reuse in the preparation of highly conjugated oils via the iron tricarbonyl complex.

Example 2

To show the action of carbon monoxide at higher pressure and lower temperature, 49.0 g. of the same iron tricarbonyl complexed soybean oil containing 28.8 g. complex used in Example 1 was charged in an autoclave and treated with carbon monoxide at an initial pressure of 2,350 p.s.i. The reaction mixture was heated at 180° C.±5° for 4 hours during which period the pressure ranged from 3,500 to 3,600 p.s.i. The conjugated oil product stripped of free iron pentacarbonyl as described in Example 1 contained 6.8% of iron tricarbonyl complex representing a total decomposition of 88.4% complex. This oil was analyzed by gas chromatography and found to contain 5.7% cis,trans conjugated diene and 43.0% trans,trans conjugated diene, making a total of 48.7% conjugated fatty acids and corresponding to an 81.6 conjugation of the total polyunsaturated fatty acids in the original soybean oil. The iron pentacarbonyl obtained from the carbon monoxide treated soybean oil iron tricarbonyl complex amounted to 9.6 g. corresponding to 83.8% of theory.

This example shows that the use of a lower temperature and a greatly increased carbon monoxide pressure than in Example 1 provides a more highly conjugated oil but a smaller yield of iron pentacarbonyl.

The necessity that the carbon monoxide pressure be about 1,000 p.s.i. or more was further indicated by an experiment in which 4 hours of reaction with carbon monoxide at a pressure of 400 p.s.i. at a temperature of 180° C. provided only a 33% decomposition of the iron tricarbonyl soybean oil mixed methyl esters prepared precisely as in Example 1 of my copending application S.N. 470,938. In view of the disappointingly low extent of decomposition, the yield of regenerated iron pentacarbonyl was not determined.

The conjugation of other domestic vegetable oils such as linseed and safflower oils and esters thereof can be achieved in the same manner as described in Examples 1 and 2 by forming the iron tricarbonyl complex of the polyunsaturated fatty acid components in high yields and then decomposing the complex and concurrently regenerating iron pentacarbonyl by heating with carbon monoxide at pressures of at least about 1,000 p.s.i. This procedure produces highly conjugated oils and regenerates iron pentacarbonyl in usefully high yields for reuse. The conjugated oils thus obtained are very useful as drying oils and form good protective films when spread as thin layers on metal plates and exposed to air and heat oxidation.

I claim:

1. A continuous process for obtaining high yields of conjugated polyunsaturated vegetable oils and reforming significant amounts of reusable iron pentacarbonyl comprising the steps of:

(a) subjecting a mixture consisting of a polyunsaturated vegetable oil selected from the group consisting of linseed, safflower, and soybean oil and 2 moles of iron pentacarbonyl per mole of a said oil to continuous heating at 185° C. for about 2 to 4 hours in the presence of pressurized nitrogen to extensively isomerize the said oil and form about 85% of theory of the iron tricarbonyl complex thereof;

(b) freeing the crude iron tricarbonyl complex reaction product of the unreacted iron pentacarbonyl and uncomplexed conjugated oil components;

(c) autoclaving the purified iron tricarbonyl isomerized oil complex for about 4 hours at 180–200° C. with sufficient carbon monoxide to therein provide an inverse reaction pressure of about 3,600–1,000 p.s.i. whereby to decompose the said complex into its constituent isomerized oil and iron tricarbonyl while concurrently converting a substantially quantitative proportion of the thereby liberated iron tricarbonyl to reusable iron pentacarbonyl; and (d) distilling said iron pentacarbonyl under a nitrogen atmosphere.

References Cited

UNITED STATES PATENTS

| | | | |
|---|---|---|---|
| 1,375,589 | 4/1921 | Levey | 260—405.6 |
| 3,090,807 | 5/1963 | Illing et al. | 260—405.6 |

NICHOLAS S. RIZZO, *Primary Examiner.*